United States Patent Office 3,846,072
Patented Nov. 5, 1974

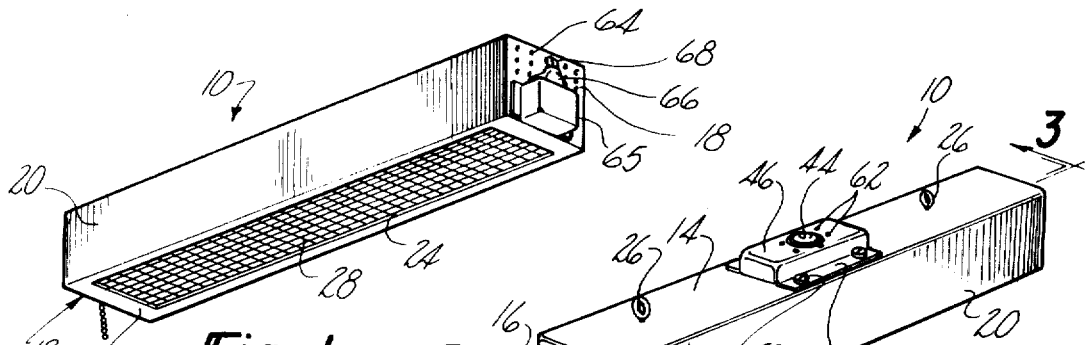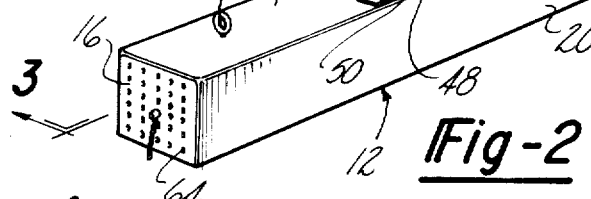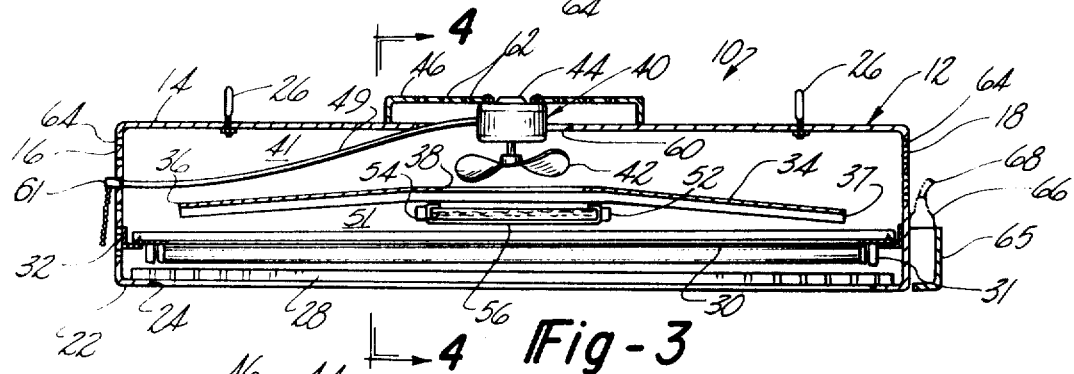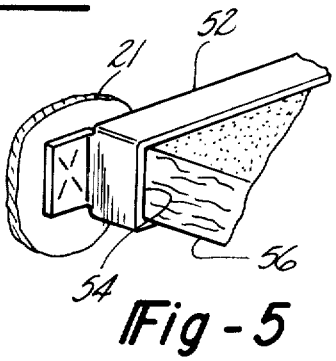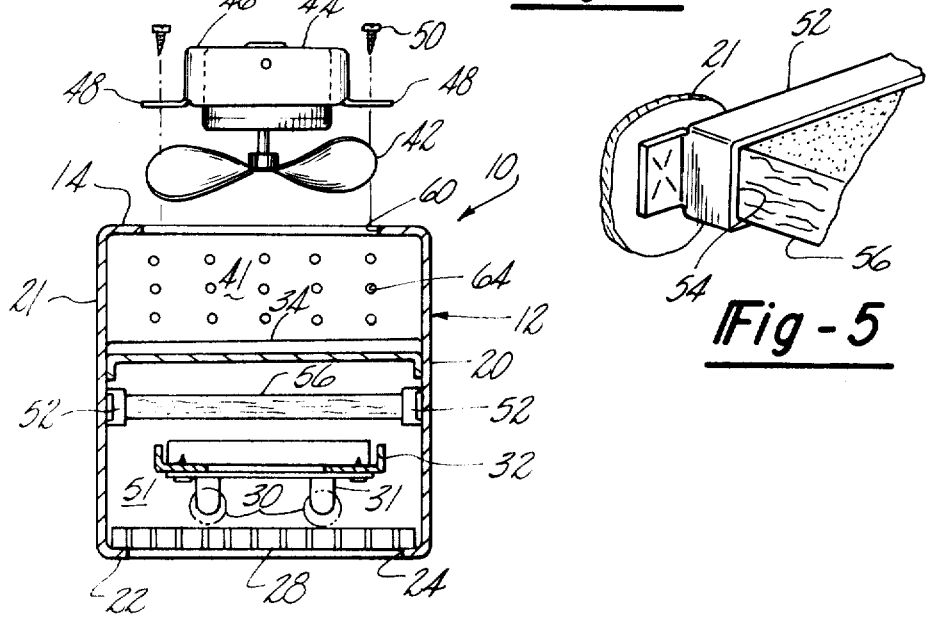

3,846,072
ULTRAVIOLET LAMP FIXTURE
Lawrence Patterson, 5272 Doherty Drive,
West Bloomfield, Mich. 48033
Filed June 28, 1973, Ser. No. 374,576
Int. Cl. A61l 9/00; H05b 33/02
U.S. Cl. 21—74 R                    8 Claims

ABSTRACT OF THE DISCLOSURE

An ultraviolet lamp fixture for purifying the air within a room by means of a plurality of hot-cathode or other commercially available ultraviolet ray tubes. The tubes are mounted within a ceiling suspended housing having a motorized fan which moves air through an opening in the bottom of the housing past the tubes for purification and exhausts a purified stream of air back into the room. Means are provided for directing the air flow to the fan while recirculating a portion of the purified air to insure that all of the air passing into the lamp fixture is purified. The lamp fixture is provided with means for both filtering and deodorizing the circulated air.

BACKGROUND OF THE INVENTION (I) Field of the Invention

The present invention relates to a means for purifying air within a room and, in particular, the present invention relates to a means for re-circulating air within a room through an ultraviolet lamp fixture for purifying the air.

(II) Description of the Prior Art

The germicidal effects of ultraviolet ray tubes due to their emitting radiation is well known and their use has been proposed in various applications. Examples of such ultraviolet lamps are disclosed in U.S. Pat. No. 2,248,618, Pat. No. 2,347,254, Pat. No. 2,350,462, Pat. No. 2,407,-379, Pat. No. 2,732,501, Pat. No. 3,107,863 and Pat. No. 3,674,421.

In certain of the apparatuses disclosed in the aforementioned U.S. patents, ultraviolet ray tubes are employed for bactericidal radiant energy and these tubes are supported in fixtures suspended directly above the zone which is desired to be sterilized. Purification is obtained by direct exposure of the tubes. In some of the prior art apparatuses persons within the zone of sterilization must usually protect their eyes from the rays of the tube or special reflective coatings boucing off the radiation must be provided. These types of apparatus are necessarily limited to the sterilization of very small areas and suitable only for a particular situation and location as the effectiveness of the ultraviolet ray is greatly minimized if any obstructions are placed between the objects to be purified and the ultraviolet tube. Further, the effect of the ultraviolet tube is greatly minimized beyond one meter from the tube. In some of the aforementioned patents, it has been suggested that certain of the aforementioned disadvantages may be overcome by providing a means for circulating the air within a room through a fixture by means of a fan or the like so that all the air passes over the tubes in close proximity thereto, and thus obtain a maximum exposure to the ultraviolet tube and a maximum kill of any airborne micro-organisms.

Although the apparatuses disclosed in the aforementioned U.S. patents may to varying degrees of success function to destroy airborne micro-organisms, they have disadvantages in their use and application which are overcome by the present invention.

SUMMARY OF THE INVENTION

The present invention which will be described subsequently in greater detail comprises an ultraviolet lamp fixture having means for forceably moving air over an ultraviolet tube for the purification of such air and for exhausting of the air back into the room.

It is therefore an object of the present invention to provide a new and improved ultraviolet lamp fixture which is simple in its construction and inexpensive to manufacture, yet one which will function to purify air in a room to remove any airborne micro-organisms and which is provided with means for insuring that all of the air exhausted from the fixture is purified.

It is also an object of the present invention for providing an ultraviolet lamp fixture having means for facilitating the easy removal and replacement of a motorized fan utilized in the forced circulation of air through the lamp fixture.

It is still a further object of the present invention to provide an ultraviolet lamp fixture having means for both filtering and deodorizing the air purified by the lamp fixture.

Other objects, advantages and applications of the present invention will become apparent to those skilled in the art of ultraviolet lamp fixtures when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like components throughout the several views, and in which:

FIG. 1 is a bottom perspective of an ultraviolet lamp fixture constructed in accordance with the principles of the present invention;

FIG. 2 is a top perspective view of the ultraviolet lamp fixture illustrated in FIG. 1;

FIG. 3 is a longitudinal cross-sectional view of the ultraviolet lamp fixture taken along line 3—3 in FIG. 2;

FIG. 4 is a partially exploded transverse cross-sectional view of the ultraviolet lamp fixture taken along line 4—4 of FIG. 3; and FIG. 5 is an enlarged fragmentary perspective view of a filter utilized in the ultraviolet lamp fixture illustrated in FIG. 1 through 4.

DESCRIPTION OF THE PREFERRED EMBODIMENT

Referring now to the drawing and, in particular, to FIGS. 1 and 2 wherein there is illustrated one example of the present invention in the form of an ultraviolet lamp fixture 10 comprising a housing 12 having a top wall 14, opposing end walls 16 and 18 and longitudinally extending side walls 20 and 21 (FIG. 4). As can best be seen in FIG. 1 a bottom wall 22 has an opening 24 defining an air inlet which will be explained in greater detail hereinafter. The housing 12 may be fabricated from any suitable material and, preferably, is fabricated from sheet metal with the various side, top and bottom walls being fastened to each other in the conventional manner, with threaded fasteners and the like, all of which is not described herein as the same is well known to those skilled in the art of fabricating housings and the like from sheet metal and comparable materials.

The top wall 14 is provided with a pair of longitudinally spaced eye bolts 26 which are utilized to permit attachment of the lamp fixture 10 to a chain or the like for suspending the light fixture 10 from the ceiling of the room (not shown) within which the light fixture 10 is adapted to be disposed to purify the air within the room. When the lamp fixture 10 is so mounted, the bottom wall 22 faces downwardly.

Referring now to FIGS. 3 and 4 wherein the interior components of the ultraviolet lamp fixture 10 are illustrated as comprising an egg crate louvered bottom unit 28 which is carried at its peripheral edges by the upper surface of the bottom wall 22 to completely cover the opening 24. The egg crate louvered bottom unit 28 is conventional in its structure to provide a plurality of openings for the passage of air therethrough and into the interior of the light fixture 10 as well as to permit downward radiation at a selected angle, for example, 45 degrees, into the room. The indirect radiation protects the persons and/or animals which would be in the room from direct radiation as the egg crate louvered bottom unit 28 emits controlled direct radiation in the upper area of the room within which it is positioned. Since such egg crate louvered bottom units are conventional in their design and construction and commercially available, a further description of the same is not necessary.

A plurality of ultraviolet ray tubes 30 are longitudinally mounted immediately above the louvered unit 28 with the ends of the tubes 30 being carried in conventional sockets 31 which, in turn, are mounted on brackets 32 carried by the inner surfaces of the end walls 16 and 18. The tubes 30 are parallel to one another and lie on the axis of the longitudinally disposed housing 12.

Immediately above the ultraviolet ray tubes 30, the housing 12 is provided with an air deflector wall 34 having its longitudinal edges affixed to the longitudinal side walls 20 and 21 while the opposite ends 36 and 37 of the deflector wall 34 are, respectively, longitudinally spaced from the end walls 16 and 18 of the housing 12 for a purpose to be described hereinafter. The deflector wall 34 slopes upwardly from the ends 36 and 37 and terminates in an air intake opening 38 through which air is drawn in by means of a motorized fan assembly 40 such that air is drawn from the room through the louvered unit 28, past the ultraviolet tubes 30 through the air intake opening 38 and into the space 41 between the upper side of the deflector wall 34 in the inside surface of the top wall 14.

The motorized fan 40 may be conventional in its construction comprising a rotating fan 42 driven by a standard electric motor 44. The motor 44, in turn, is carried by a motor housing 46 which has a pair of laterally extending flanges 48 (FIG. 4) that are fastened to the upper surface of the wall 14 by any suitable means such as screws 50. The housing 46 is so attached to the upper wall 14 that the fan blades 42 are positioned immediately over the air intake opening 38 when the housing 46 is attached to the wall 14. Suitable electrical wiring 49 may be provided to connect the motor 44 to a source of electricity and separate switches are provided to turn the fan and ultraviolet tubes on and off. The motor 44 is turned on and off by a pull string operated switch 61 such that the motor 44 can be turned off while the tubes are still operating and directing radiation in the room. Thus operation of the tubes may be had when a reduced noise level is desired. Such electrical connections are all conventional and a further description thereof is not necessary.

As can best be seen in FIG. 4, the housing 46 and the motor assembly 40 may be simply and conveniently removed from the ultraviolet lamp fixture 10 by removing the threaded screws 50. Since it is anticipated that the ultraviolet lamp of the type described herein will be run continuously for 24 hour periods, the fan motors must be easily accessible as they will have to be replaced from time to time throughout the life of the lamp fixtures and the simple means provided for its attachment will permit the owner and user of the lamp to replace the same without having to employ a skilled workman or the like.

In the space 51 between the deflector wall opening 38 and the ultraviolet tubes 30 there is provided a pair of laterally extending wall brackets 52 which are attached at their opposite ends to the longitudinal side walls 20 and 21 of the ultraviolet lamp fixture 10. The brackets 52, as can best be seen in FIG. 5, are provided with longitudinal recesses 54 which facilitate the entry and thus support of a filter element 56 which is adapted to filter air that is moving by the ultraviolet tubes 30 and through the air intake opening 38. Such filters are commercially available and are particularly adapted to remove pollen and other airborne material from the air to further purify the same. When the filter element 56 becomes clogged, it may be simply removed from the supports 52 as such filter elements 56 are generally flexible in their construction and can be easily removed and/or inserted, as desired. It should be noted that the opposite ends of the brackets 52 are spaced below the deflector wall 34 a sufficient distance to permit air to bypass the filter element 56 and pass directly through the opening 38. This is provided to insure a constant flow of air through the housing 10, particularly, if the filter element 56 should become clogged. Thus, the filter element 56 may be easily bypassed when the same is clogged and the user of the device need not be concerned with constantly checking the filter element 56 and the user is assured that the ultraviolet lamp fixture 10 is functioning in the desired manner in that a predetermined amount of air is being circulated through the lamp fixture 10.

In use, the lamp 10 is mounted from the room ceiling, as aforementioned, and when the motor 44 is actuated to rotate the fan 42, air is drawn up from the room through the louvered unit 28 past the tubes 30 whereupon the radiation emitted from the tubes 30 will be effective to kill all airborne micro-organisms passing thereby. Air then is deflected by means of the wall deflector 34 to the opening 38 wherein it is directed by the force of the fan into the space 41 between the top wall and backside of the deflector wall 34. Air has also passed through the filter element 56 for further purification and removal of pollen, dirt and the like therefrom. The air under the force of the fan 42 is then directed either upwardly through an aperture 60 in the top wall and exhausted through a plurality of apertures 62 in the top side of the fan motor housing 46 for re-circulation into the room while at the same time providing a cooling effect of the fan motor 44. Additionally, a substantial amount of the air passing through the opening 38 is forced longitudinally across the length of the housing and is exhausted through a plurality of apertures 64 in the opposite end walls 16 and 18 of the housing 12 for re-circulation into the room.

A portion of the air directed toward the end walls 16 and 18 will pass between the same and the deflector wall ends 36 and 37 and back into the lower section 51 of the housing 12 for mixing with new air entering through the louvered unit 28 and re-circulation through the opening 38. This re-circulation of the air past the opposite ends 36 and 37 of the deflector wall 34 insures that all air entering through the louvered section will pass by the tubes and is passed through the filter element 26 and the air opening 38.

As can best be seen in FIGS. 1 and 3, the end wall 18 is provided with a container 65 within which a bottle 66 is mounted. The bottle 66 is preferably provided with a deodorant which is emitted into the atmosphere through a wick 68 such that the air exhausted through the apertures 64 in the side wall 18 passes over the deodorizer. Thus the fan assembly 40 is utilized not only to draw air across the tubes 30 for the destruction of the airborne micro-organisms, but the same air is deodorized in a simple manner. Because of its easy access, the bottle 66 may be simply replacd when it is empty or additional deodorant added.

The use of the egg crate louvered unit 28 insures by only a fractional off-center positioning of the lamp 10 that persons and animals below the lamp 10 are not in any danger of receiving any of the bad side effects of ultraviolet lamps, namely conjunctivitis (eyeburn) and erythemea (skinburn).

Additionally, the tube facing side of the deflector wall 34 may be coated with a material adapted to reflect rays from the ultraviolet lamp tubes 30 downwardly so that, in addition, to the kill area obtained by the direct passage of the air across the tubes 30, radiation is also directed from the tube 10 in the same manner as more conventional direct ultraviolet units function.

It can also be seen that the deflector wall 34 provides a multitude of uses and specifically the deflector wall functions to direct air being passed over the tubes through the filter element 56 and into the opening 38. Secondly, the wall 34 functions to permit a certain amount of the air flowing through the opening 38 to be re-circulated by the tubes 30 and filter element 56. Thirdly, the coating of the tube facing side of the wall 34 functions to further direct radiation outwardly through the louvered unit 28, as aforementioned.

It can be seen the present invention provides a new and improved ultraviolet lamp fixture having numerous advantages over the prior art structures. The lamp fixture of the present invention may be simply and easily constructed to provide a forced circulation of air within a room across ultraviolet tubes for the destruction of airborne micro-organisms and for the filtering and deodorization of the air. It can also be seen that the ultraviolet lamp fixture of the present invention is provided with an extremely simple means for removing the motorized fan unit when the same needs repair or replacement.

Although only one example of the present invention has been disclosed, it should be understood by those skilled in the art of ultraviolet lamp fixtures that other forms may be had all coming within the spirit of the invention and scope of the appended claims.

What is claimed is as follows:

1. An ultraviolet lamp fixture for purifying the air within a room, said fixture comprising a housing having means for suspending said fixture from the ceiling of said room, the bottom wall of said housing having a longitudinally extending opening defining an air inlet through which the air in said room is communicated to the interior of said fixture; an elongated ultraviolet ray tube mounted in said housing above said air inlet; a longitudinally disposed air deflector wall mounted in said housing above said tube, the opposite longitudinal ends of said deflector wall being longitudinally spaced from the end walls of said housing, said deflector wall being inclined upwardly from the said longitudinal ends of said deflector wall and terminating in an intake opening; a motorized fan supported by the top wall of said fixture housing and disposed immediately above said deflector wall intake opening for positively moving air from said room into said housing at said air inlet end and through said longitudinal wall intake openng to the space behind said deflector wall, said housing having a plurality of apertures on said opposite longitudinal end walls and said top wall for exhausting air from said space to said room, a portion of said air flowing through said space passing between said end walls and said oposite ends of said deflector wall for recirculation through said intake opening, whereby all of the air entering said housing through said air inlet is passed over said tube and the stream of air entering said housing and exhausted back to said room is purified by the radiation emitted by said tube.

2. The ultraviolet lamp fixture defined in Claim 1, wherein the top wall of said housing has an aperture aligned with the opening in said deflector wall, said top wall aperture facilitating the passage therethrough of a motorized fan, said motorized fan having means for releasably attaching same to said top wall of said housing such that said motorized fan may be removed from said housing to facilitate easy replacement thereof.

3. The ultraviolet lamp fixture defined in Claim 1 further comprising deodorizing means carried externally of said housing on one of said side walls, said deodorizing means being adjacent said apertures associated with said one side wall such that the air passing thereby may be deodorized by said last mentioned means.

4. The ultraviolet lamp defined in Claim 1, wherein means are provided for selectively operating said tube and said fan independently of each other.

5. The ultraviolet lamp fixture defined in Claim 1 further comprising a filter means carried within said housing between said tube and said deflector wall opening, said filter being adapted to trap pollen and dust and the like to remove same from the air stream passing therethrough.

6. The ultraviolet lamp fixture defined in Claim 5, wherein said filter is removably attached to said housing to facilitate the replacement of said filter.

7. The ultraviolet lamp defined in Claim 1, wherein said air inlet defined by said opening in the bottom wall of said housing is provided with an egg crate type louvered opening for limiting radiation from said tube downwardly into said room at a limited angle.

8. The ultraviolet lamp defined in Claim 7, wherein the tube facing side of said deflector wall is coated with a material adapted to reflect said ultraviolet tube radiation downwardly through said egg crate louvered air inlet.

References Cited
UNITED STATES PATENTS

| | | | |
|---|---|---|---|
| 2,359,021 | 9/1944 | Campbell et al. | 21—74 R X |
| 2,654,021 | 9/1953 | Bartholomew | 240—51.11 R |
| 2,732,501 | 1/1956 | Blaeker | 21—74 R X |
| 2,754,554 | 7/1956 | Mills | 21—74 R X |
| 3,072,978 | 1/1963 | Minto | 21—74 R |
| 3,157,362 | 11/1964 | Waly | 240—47 X |
| 3,179,794 | 4/1965 | Waly | 240—51.11 R |
| 3,582,642 | 6/1971 | Johansson | 240—78 LD |

MORRIS O. WOLK, Primary Examiner

A. TURK, Assistant Examiner

U.S. Cl. X.R.

21—102 R; 55—102, 279, 467; 240—9 A, 51.11 R; 250—438